Nov. 5, 1929.                J. I. HULL                1,734,907
                        BRUSH SHIFTING DEVICE
                    Filed Sept. 13, 1928        2 Sheets-Sheet 1
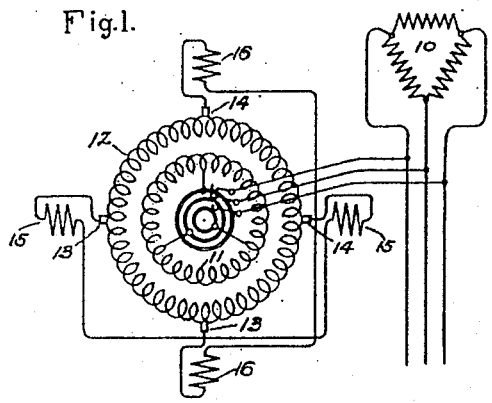
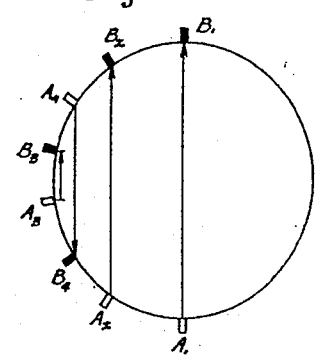
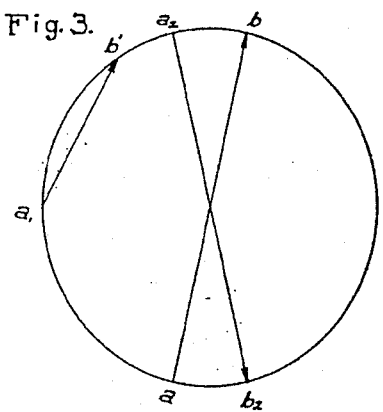
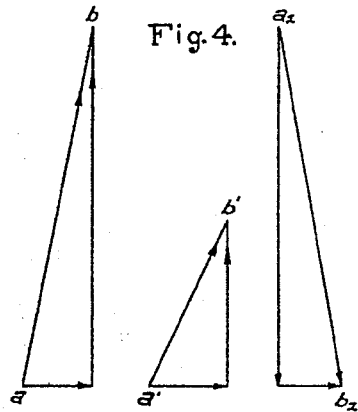
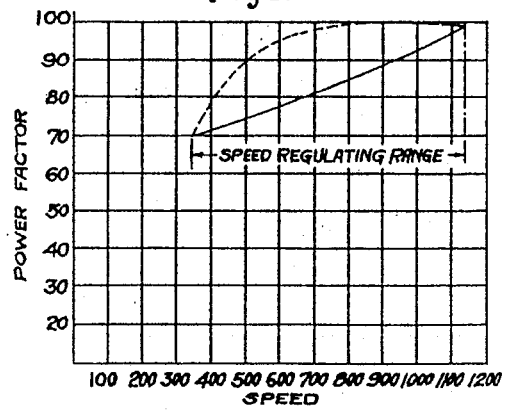
Inventor:
John I. Hull,
by Charles V. Tullar
His Attorney.

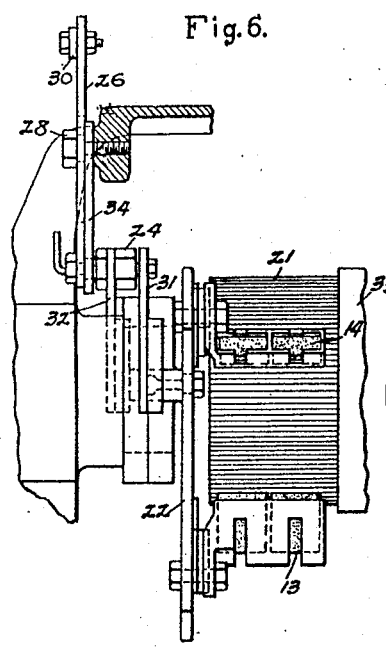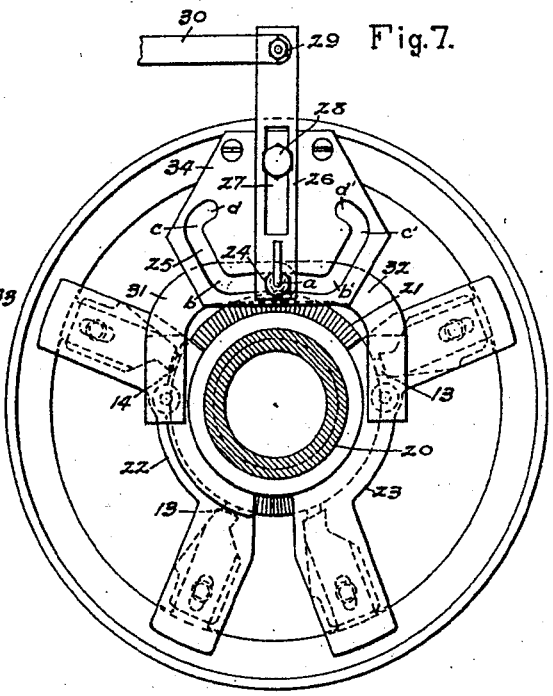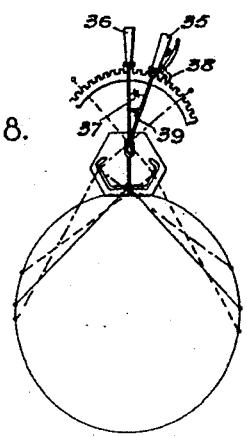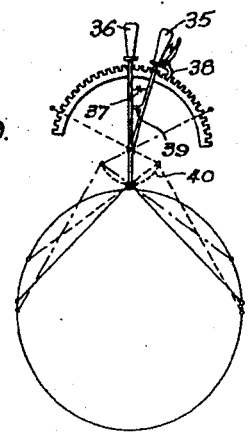

Patented Nov. 5, 1929

1,734,907

UNITED STATES PATENT OFFICE

JOHN I. HULL, OF SCHENECTADY, NEW YORK, ASSIGNOR TO GENERAL ELECTRIC COMPANY, A CORPORATION OF NEW YORK

BRUSH-SHIFTING DEVICE

Application filed September 13, 1928. Serial No. 305,763.

My invention relates to a brush shifting device, arranged to be used on the same type of motors and to accomplish the same general purpose as illustrated and explained in my former Letters Patent No. 1,590,030 and has for its object a simpler means of shifting the brushes with the additonal features that provisions are made for a special starting brush position to render an abnormally high or an abnormally low starting torque and for brush shifting speed adjusting means independent of the starting adjustment means so that the motor can be stopped and restarted without the necessity of the operator having to again find by trial the brush position best suited to the process.

The speed of the motor referred to and described in Patent No. 1,590,030 is controlled by shifting two brush yokes according to the laws disclosed therein. The machine may be considered to be an induction motor having the primary winding on the rotor and the secondary windings on the stator and preferably having a regulating winding on the rotor and connected to a commutator. Each phase of the stator windings is independent and connected to the commutator by means of brushes, one end being connected to a brush on one brush yoke the other end to another brush on a separate brush yoke. In a motor of this type it is known that when the brushes connecting the opposite ends of the secondary phase windings are on the same commutator segment no voltage will be injected into the secondary. The secondary phases are short-circuited so that at no load the motor will operate at approximately synchronous speed as an ordinary induction motor. If the brush yokes are moved in opposite directions an electromotive force is injected into the secondary winding, then by movement of the brushes the speed of the motor may be changed or the brushes may be moved in such a position with respect to each other that correction of the power factor may be obtained.

In accordance with my invention I provide a simpler brush shifting arrangement for this type of motor than that explained in Patent No. 1,590,030 with the further provision for a high or low starting torque adjustment when starting the machine and independent means for speed adjustment.

The features of my invention which I believe to be novel and patentable will be pointed out in the claims appended hereto. For a better understanding of my invention reference is made in the following description to the accompanying drawings in which Fig. 1 represents the electrical connections of a commutator machine to which my invention is applicable; Fig. 2 represents the relation of the brushes on the commutator to the resulting voltage vectors injected into the secondary by the commutator for different speeds where no attempt is made to improve the power factor; Fig. 3 represents vectorially one result obtained by my improved brush shifting arrangement in which there is at all speeds a voltage component in quadrature with the speed regulating component for improving the power factor. These components are separately illustrated in Fig. 4. Fig. 5 illustrates by means of curves the improvement in power factor that may be obtained by means of my improved mechanism. Figs. 6 and 7 show different views of the brush adjusting mechanism applied to the machine to be regulated. Fig. 8 illustrates one embodiment of means used for adjusting the speed of the motor combined with the independent brush adjusting arrangement for starting the machine and the automatic device arranged so the brushes will return to the predetermined running position of the motor after starting. Fig. 9 shows a modification.

Referring to Fig. 1, 10 represents a source of polyphase supply, 11 the primary rotor winding supplied from the polyphase system by means of slip rings and brushes as illustrated, 12 represents the commutated regulating winding on the rotor, 13 and 14 represent brushes connected to the corresponding ends of the independent secondary windings 15 and 16. The function of the brushes 13 and 14 is to make electrical connection between the ends of the secondary windings and the commutator of the regulating winding but for simplification I have omitted the commutator and show these brushes resting directly on the commutated regulating winding 12.

In Fig. 2 I have shown the vector relations of the voltage injected into the secondary winding 12 as the brushes are shifted in opposite directions for the purpose of speed control. The letter A represents the brushes connected to one end of the secondary phases and the letter B to the other end. $A_1$ and $B_1$ represent the position of the brushes on the commutator when the greatest voltage is injected into the secondary and the motor is running at minimum speed. When the brushes are moved to the position of $A_2$, $B_2$ the speed of the motor has been slightly increased. $A_3$ and $B_3$ represent the positions of the brushes when the speed of the motor is near synchronism. $A_4$ and $B_4$ represent the positions of the brushes on the commutator when the speed of the motor is moved slightly above synchronism.

In Fig. 3 I have indicated how the relations of Fig. 2 may be advantageously changed for the maximum and minimum speed in order to obtain better power factor. In Fig. 4 I have represented these vectors so it will be seen that in each of the vectors there is not only a vertical component to regulate the speed but also a component in quadrature to adjust the power factor, it will be apparent that by displacing the brushes on the commutator as illustrated by the vectors in Fig. 3 there will always be a component in quadrature as shown in Fig. 4 for the regulation of the power factor. In Fig. 5 I have represented by the dotted line curve the higher power factor that may be obtained by the use of my mechanism at different speeds in comparison to the solid line curve where the power factor is not subject to correction at all points of the speed range.

In Figs. 6, 7 and 8 I have illustrated one embodiment of my invention. In Fig. 7, 20 represents the bearing and brush rigging support of the motor, 21 the commutator of the regulating winding, 13 and 14 the brushes connected to the different ends of the phases of the secondary as shown in Fig. 1 resting on the commutator 21 and 22 and 23 are the brush yokes. These yokes are pivotally connected to the driving links 31 and 32. The driving links are pivotally connected to the lever 26, which will hereafter be referred to as the operating member, by means of a bolt 24. The operating member is held in position and pivoted by a bolt 28. Rod 30 is preferably extended to another machine or operating lever, not shown, and connected to the operating member at position 29. The machine to which the opposite end of rod 30 may be connected is operated by the motor on which the brush shifting mechanism is fixed and so arranged to impart the desired motion to the rod 30 so as to move the operating member in the desired position. Bolt 24 which connects the driving links is allowed to move in the slot 25 of a supporting plate 34. It is obvious that as the operating member is moved by the rod 30 it will cause a movement of the brushes. The slot 25 is so constructed as illustrated by the diagram that when the operating member is moved from its central position $a$ the brush yokes are moved in the same direction causing a shift of the brush axis while maintaining approximately the same small separation between brushes of the end of a phase until the point $b$ is reached. If the operating member is continued to be moved away from its central position $a$ toward $b$, when it approaches point $b$ the angular velocity of the brush yoke 22 will have decreased while the angular velocity of the brush yoke 23 has been increased. After point $b$ is passed the direction of rotation of the brush yoke 22 is reversed. As the operating member is moved from $b$ to $c$ the brushes are shifted in opposite directions and varying relative angular velocities. When the operating member has reached the position $c$ brush yoke 23 will gradually become inactive while the brush yoke 22 will continue to be shifted over a part of its operative surface. After the point $c$ is passed brush yoke 23 will be shifted in the opposite direction. Thus both brush yokes will be shifted in the same direction until the point $d$ is reached. The brushes may be returned to their original position by similar movements. As I have illustrated in the drawing the operating member may be moved in either direction from the central position $a$, thus rotating the brushes with or against the direction of rotation of the machine and so lowering or raising the speed from its synchronous value.

As the operating member is moved from $a$ to $d$ or from $a$ to $d'$, the distance from the bolt 28 to the bolt 24, which connects the driving links to the operating member, will continually change. I have made arrangements for this by means of the groove 27 allowing the operating member to move so as to change the distance from bolt 28 to bolt 24.

Fig. 6 shows a different view of the mechanism as it is connected to the frame of the motor. 33 represents the rotating part of the motor, 13 and 14 the brushes of one of the brush yokes. I have also illustrated the connections of the driving links 31 and 32 to the bolt 24 and the operating member 26 to the bolt 28.

In Fig. 8 I have illustrated how the brushes may be shifted, as explained in Fig. 7 when the movements of the operating member are controlled by hand. The speed adjusting handle is shown in some predetermined desired running position of the motor. When the motor is stopped the brushes will remain in the position illustrated, but it is often desirable to shift the brushes so that the motor will draw a comparatively small amount of current at starting. There are also conditions under which it is desirable to increase or decrease the starting torque from what it would be with the brushes in the desired running position. This may be provided for by an independent starting handle 36. The brushes will be moved to give the desired starting torque by movement of the starting handle 36 while the speed adjusting handle 35 is held in position by a clutch 38 or any other device that may be desired. The starting handle 36 is attached to the speed adjusting handle 35 by means of a spring 37 so that when the starting handle is moved to obtain the desired starting position and the machine is up to speed then the starting handle when released will be pulled back by spring 37 against a stop 39, thus moving the brushes back to their original running position. It will be obvious that a starting device of this kind may be used when the speed adjusting member is connected to a separate machine as illustrated and explained in connection with Fig. 7.

From illustrations of the operating member in Figs. 7 and 8 of the operating member it may be noted that any radial movement of the operating member will cause the brushes to be moved in opposite directions and any angular movement of the operating member will cause them to be rotated in the same direction.

It will be noted in Figs. 7 and 8 I have illustrated the groove through which the pivoted connection of the driving links are connected to the operating member as being irregularly shaped, but I do not wish to limit my invention to a guiding groove or one of this shape. It will be obvious that the contour of the cam or other stationary plate may be of any desired shape depending upon the regulating characteristics desired, or it may be advisable to dispense with the cam or stationary plate altogether as I have illustrated in Figure 9, thus rotating the pivoted connections through the arc of a circle as illustrated by the dotted lines 40. When the cam or stationary plate is dispensed with as illustrated in Figure 9 it will not be necessary to provide for any radial movement of the pivoted connection.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. A brush shifting mechanism for a dynamo electric machine comprising two adjustable brush yokes, two adjusting means for said brush yokes pivotally connected, a stationary cam, and means for moving said pivoted connection of the adjusting means around the contour of said cam.

2. A brush shifting device for a dynamo electric machine comprising two adjustable brush yokes, two adjustable means pivotally connected together for moving said yokes, a reversible operating member pivotally connected to said adjustable means at their pivot connection, and a supporting plate with a groove for guiding said pivoted connection.

3. A brush shifting device for a dynamo electric machine comprising two adjustable brush yokes, an operating lever, two driving links pivotally connected to said adjustable brush yokes and lever, a supporting plate for said lever and links having a cam slot therein and a connection between said plate and lever permitting radial and angular movement of the operating lever as it moves the pivoted connection of the driving links around the contour of the cam.

4. In combination, an alternating current motor provided with a primary winding and a commutated regulating winding on the rotor and independent secondary windings on the stator, a brush shifting device for the said motor comprising two adjustable brush yokes, each yoke supporting brushes connected to the corresponding ends of the secondary windings, driving means associated with said brush yokes, a reversible operating member for moving said driving means, means for guiding said driving means when moved by the operating member so that the angular velocity of one brush yoke decreases while the other increases over a portion of the regulating range, and an additional operating member for moving said driving means independently of the position of the first mentioned operating member.

5. A brush shifting mechanism for a dynamo electric machine comprising a pair of brush yokes, an adjustable mechanism for simultaneously moving said brush yokes to a desired operating position, and additional means for moving said brush yokes independently of said adjusting mechanism which when released allows the brush yokes to return to the operating position determined by the position of said adjusting mechanism.

6. A brush shifting mechanism for a dynamo electric machine comprising two brush yokes, two adjusting means for said brush yokes, one of which may be moved and locked in any desired operating position of the yokes, and the other of which may be moved independently to temporarily shift said yokes to another position, and means for returning said yokes to the first mentioned position when the second mentioned adjusting means is released.

7. An electric motor having a commutator and adjustable brushes for regulating the speed of the motor, a brush shifting mechanism therefor comprising two brush yokes, driving links for said yokes, a speed adjusting lever for operating said links provided with locking means to secure it in any desired adjustable position and a starting lever secured to the speed adjusting lever by a resilient connection for temporarily moving said links and yokes to a desired starting position.

In witness whereof I have hereunto set my hand this 6th day of September, 1928.

JOHN I. HULL.